Figure 1:
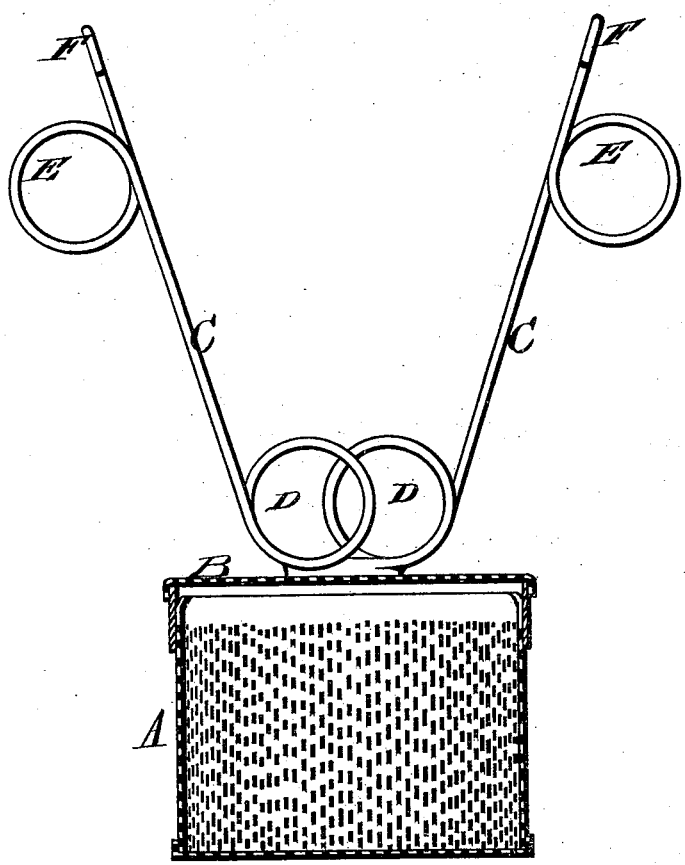

M. O'CONNOR.
COFFEE-FILTER.

No. 187,407. Patented Feb. 13, 1877.

UNITED STATES PATENT OFFICE.

MICHAEL O'CONNOR, OF SPARTA CENTRE, MICHIGAN, ASSIGNOR OF ONE-HALF HIS RIGHT TO ALBERT BETTERLY, OF SAME PLACE.

IMPROVEMENT IN COFFEE-FILTERS.

Specification forming part of Letters Patent No. 187,407, dated February 13, 1877; application filed January 6, 1877.

*To all whom it may concern:*

Be it known that I, MICHAEL O'CONNOR, of Sparta Centre, in the county of Kent and State of Michigan, have invented a new and valuable Improvement in Coffee-Filters; and I do hereby declare that the following is a full, clear, and exact description of the construction and operation of the same, reference being had to the annexed drawings, making a part of this specification, and to the letters and figures of reference marked thereon.

The figure of the drawings is a representation of central vertical section of my coffee-filter.

This invention relates to strainers for making coffee.

The nature of said invention consists in the combination, with each strainer, of two springs, whereby the same is suspended in the coffee-pot; also, in providing the said springs with hooks, whereby they may be temporarily secured together at their upper ends, so as to facilitate their insertion into and removal from the coffee-pot; also, in providing said springs with loops, which serve as handles.

In the annexed drawings, A designates a small cylindrical strainer, made of finely-perforated metal, and provided with a cover, B, of similar construction. To the middle of said cover two diverging suspending-springs, C C, are attached, each of which is provided with a lower loop or coil, D, for the purpose of increasing its elasticity, and with an upper loop or ring, E, which answers as a handle; also, with a hook, F, above said handle. Said hooks F are adapted to engage with one another, so as to retain said springs in a compressed position, when they occupy but little space.

The said devices are used as follows: The said cover B is removed from strainer A, and the said strainer is filled, wholly or partly, with ground coffee. The said cover is then replaced, and fits too tightly to be casually displaced. The coffee-pot is then supplied with hot water, and the said strainer is inserted within the same, the springs C C being compressed and attached together at the top by hooks F F, so as to facilitate the admission of the same. Said springs are then disengaged and expand in opposite directions, pressing against the inside of the coffee-pot, so as to suspend the said strainer within the hot water. The construction of said strainer allows that liquid to have free access to all of its contents, and a strong infusion of coffee is soon produced. When the flavor has been extracted from the ground coffee within the said strainer the operator takes hold of springs C C by loops or rings E E, and, compressing said springs, raises them and the said strainer out of the coffee-pot. The said cover B may subsequently be removed from the said strainer, in order to permit its contents to be removed and its inside cleansed. If preferred, the hooks or catches at the tops of the springs need not be used, as the said springs may be retained in a compressed position by the hand of the operator during insertion and withdrawal. Any other suitable form of catches may also be substituted for them.

What I claim as new, and desire to secure by Letters Patent, is—

1. A filter for tea or coffee pots provided with suspending-springs C C, having loops E and D, and free upper ends, said springs being attached to cover B of perforated filter A, substantially as described, and for the purpose set forth.

2. A strainer, A, provided with suspending-springs which have loops or rings near their upper ends, substantially as and for the purpose set forth.

In testimony that I claim the above I have hereunto subscribed my name in the presence of two witnesses.

MICHAEL O'CONNOR.

Witnesses:
JOHN ECKELS,
LAWSON A. PAINE.